(12) United States Patent
Atkins (10) Patent No.: US 6,398,321 B1
(45) Date of Patent: Jun. 4, 2002

(54) ALGORITHM FOR SCHEDULING EXTRA REAPPLY PULSES IN A REAR WHEEL ANTI-LOCK BRAKE SYSTEM

(75) Inventor: Thomas M. Atkins, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/471,726

(22) Filed: Aug. 14, 2000

Related U.S. Application Data (63) Continuation of application No. PCT/US98/13375, filed on Jun. 26, 1998.
(60) Provisional application No. 60/051,167, filed on Jun. 27, 1997.

(51) Int. Cl.$^7$ ................................................ B60T 8/66
(52) U.S. Cl. ....................................................... 303/158
(58) Field of Search ......................................... 303/158

(56) References Cited

U.S. PATENT DOCUMENTS

| | | | |
|---|---|---|---|
| 3,637,264 A | * | 1/1972 | Leiber et al. .................. 303/61 |
| 3,704,043 A | * | 11/1972 | Hickner et al. ................ 303/20 |
| 3,951,467 A | * | 4/1976 | Fleagle .......................... 303/20 |
| 4,418,966 A | | 12/1983 | Hattwig |
| 4,668,023 A | | 5/1987 | Every et al. |
| 4,673,226 A | | 6/1987 | Every et al. |
| 4,790,607 A | | 12/1988 | Atkins |
| 4,825,371 A | | 4/1989 | Hoashi et al. |
| 4,865,399 A | | 9/1989 | Atkins et al. |
| 4,886,332 A | | 12/1989 | Atkins |
| 5,292,187 A | | 3/1994 | Onaka et al. |
| 5,328,254 A | | 7/1994 | Youngblood |
| 5,369,585 A | | 11/1994 | Okubo |
| 6,019,441 A | * | 2/2000 | Lloyd et al. ................. 303/156 |
| 6,217,134 B1 | * | 4/2001 | Kato et al. ................... 303/158 |

FOREIGN PATENT DOCUMENTS

DE       19703210 A     7/1997

* cited by examiner

Primary Examiner—Christopher P. Schwartz
Assistant Examiner—Robert A. Siconolfi
(74) Attorney, Agent, or Firm—MacMillan, Sobanski & Todd, LLC

(57) ABSTRACT

Reapply pulses for increasing the brake fluid pressure applied to controlled wheel brakes in an anti-lock brake system are generated as a function of vehicle speed. A reapply pulse is generated when the vehicle speed decreases by a predetermined amount.

11 Claims, 7 Drawing Sheets

ALGORITHM FOR SCHEDULING EXTRA REAPPLY PULSES IN A REAR WHEEL ANTI-LOCK BRAKE SYSTEM

CROSS REFERENCE TO RELATED APPLICATIONS

This application claims the benefit of U.S. Provisional Application No. 60/051,167, filed Jun. 27, 1997 and International Patent Application No. PCT/US98/13375 filed Jun. 26, 1998.

BACKGROUND OF THE INVENTION

This invention relates in general to anti-lock brake systems and in particular an algorithm for scheduling extra reapply pulses in a rear wheel antilock brake system.

An Anti-lock Brake System (ABS) is often included as standard or optional equipment on new vehicles. When actuated, the ABS is operative to control the operation of some or all of the vehicle wheel brakes. One type of ABS controls only the vehicle rear wheel brakes. Such a system is referred to as a RWAL in the following.

Figure 1:
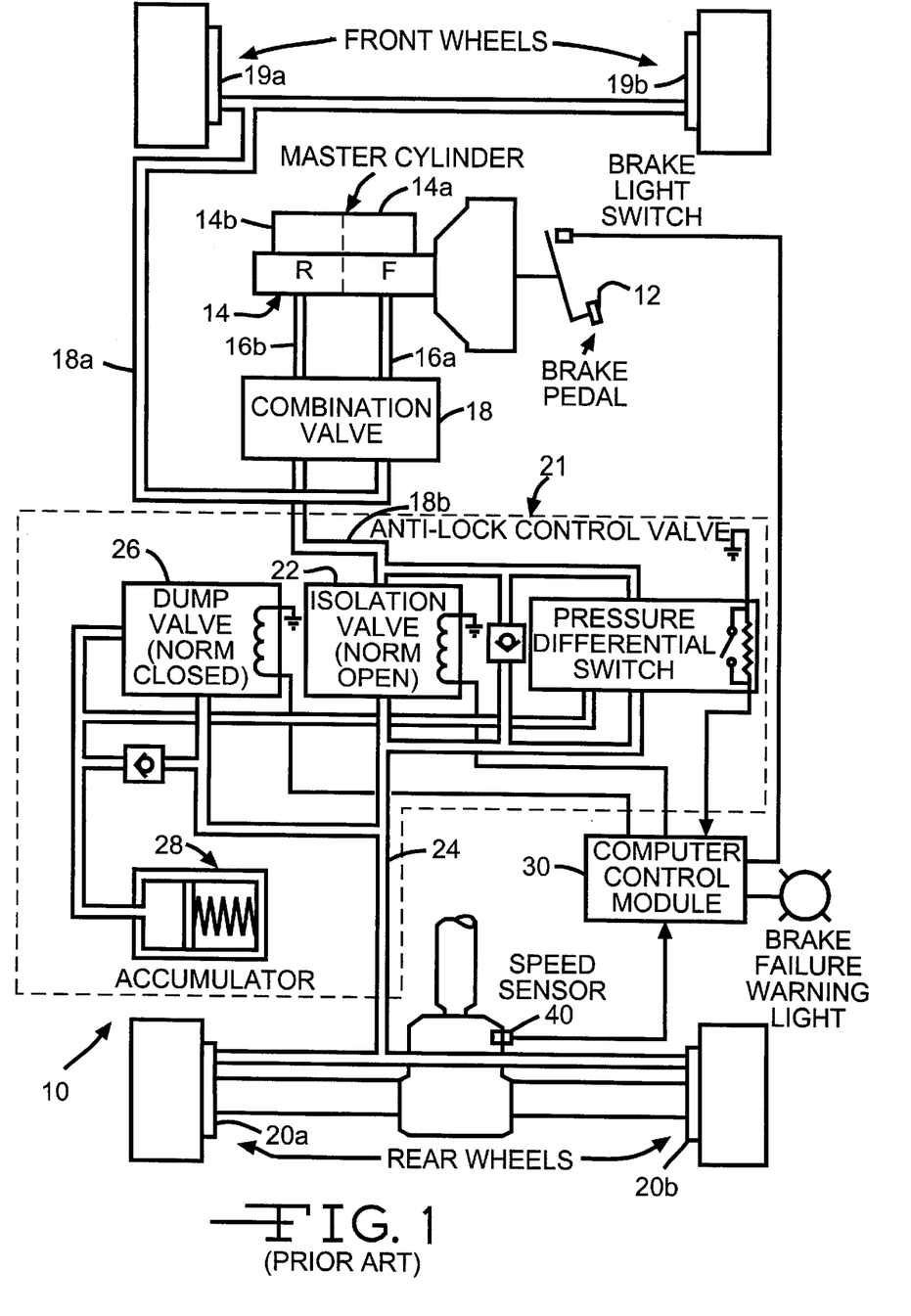
FIG. 1 is a schematic diagram of a prior art rear wheel anti-lock brake system.

A typical prior art RWAL is illustrated at 10 in FIG. 1. As shown in FIG. 1, the RWAL 10 is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through a hydraulic line 16b to a conventional combination or proportioning valve 18. The combination valve 18 includes a first output line 18a adapted to supply hydraulic fluid at a first predetermined pressure to actuate a pair of vehicle front wheel brakes 19a and 19b. The combination valve 18 also includes a second output line 18b which supplies hydraulic fluid at a second predetermined pressure to actuate a pair of vehicle rear wheel brakes 20a and 20b.

The RWAL 10 shown in FIG. 1 utilizes a control valve 21 to selectively control the application of pressure to the rear wheel brakes 20a and 20b when the system is in an anti-lock braking mode. The control valve 21 includes a normally open solenoid valve 22 connected between the line 18b and a line 24 which supplies pressurized brake fluid to the controlled rear wheel brakes 20a and 20b. During an anti-lock braking cycle, the normally open valve 22 isolates the rear wheel brakes 20a and 20b from the master cylinder 14 and is commonly referred to as an isolation valve. The isolation valve 22 also can be selectively opened to increase the pressure at the rear wheel brakes 20a and 20b.

The control valve 21 also includes a normally closed solenoid valve 26, which is connected between the line 24 and a fluid accumulator 28. The normally closed valve 26 is commonly referred to as a dump valve. The dump valve 26 is selectively opened to reduce the pressure at the rear wheel brakes 20a and 20b by bleeding brake fluid from the rear wheel brakes to the accumulator 28. In the RWAL 10, the master cylinder 14 provides a source of pressurized hydraulic brake fluid during an anti-lock braking cycle, thus eliminating the need for a separate source of pressurized hydraulic fluid, such as a motor driven pump, which is usually included in a four wheel ABS.

The RWAL 10 further includes a computer control module 30 which is electrically connected to a wheel speed sensor 40. The control module 30 can be mounted directly upon the control valve 21 or located remotely therefrom. The control module 30 includes a RWAL microprocessor (not shown) which is programmed to control the RWAL 10 in accordance with a RWAL control algorithm and parameters permanently stored in a Read Only Memory (ROM). The RWAL microprocessor also can access a Random Access Memory (RAM) for temporary storage and retrieval of data. A detailed description of the RWAL illustrated in FIG. 1 is included in U.S. Pat. Nos. 4,790,607 and 4,886,322.

During vehicle operation, the microprocessor in the RWAL control module 30 continuously receives speed signals from the wheel speed sensor 40. The RWAL microprocessor monitors the speed signals for potential rear wheel lock-up conditions. When the vehicle brakes are applied and the RWAL microprocessor senses a first rear wheel speed departure, which is indicative of an impending wheel lock-up condition, the RWAL microprocessor is responsive thereto to close the isolation valve 22 to isolate the rear wheel brakes 20a and 20b from the master cylinder 14. The RWAL microprocessor then selectively opens the dump valve 26 to reduce the pressure applied to the rear wheel brakes 20a and 20b and thereby correct the rear wheel speed departure. Once the wheel speed departure has been corrected and the controlled wheel has spun up to the vehicle speed, the microprocessor opens the isolation valve 22 to initiate a second wheel speed departure.

Figure 2:
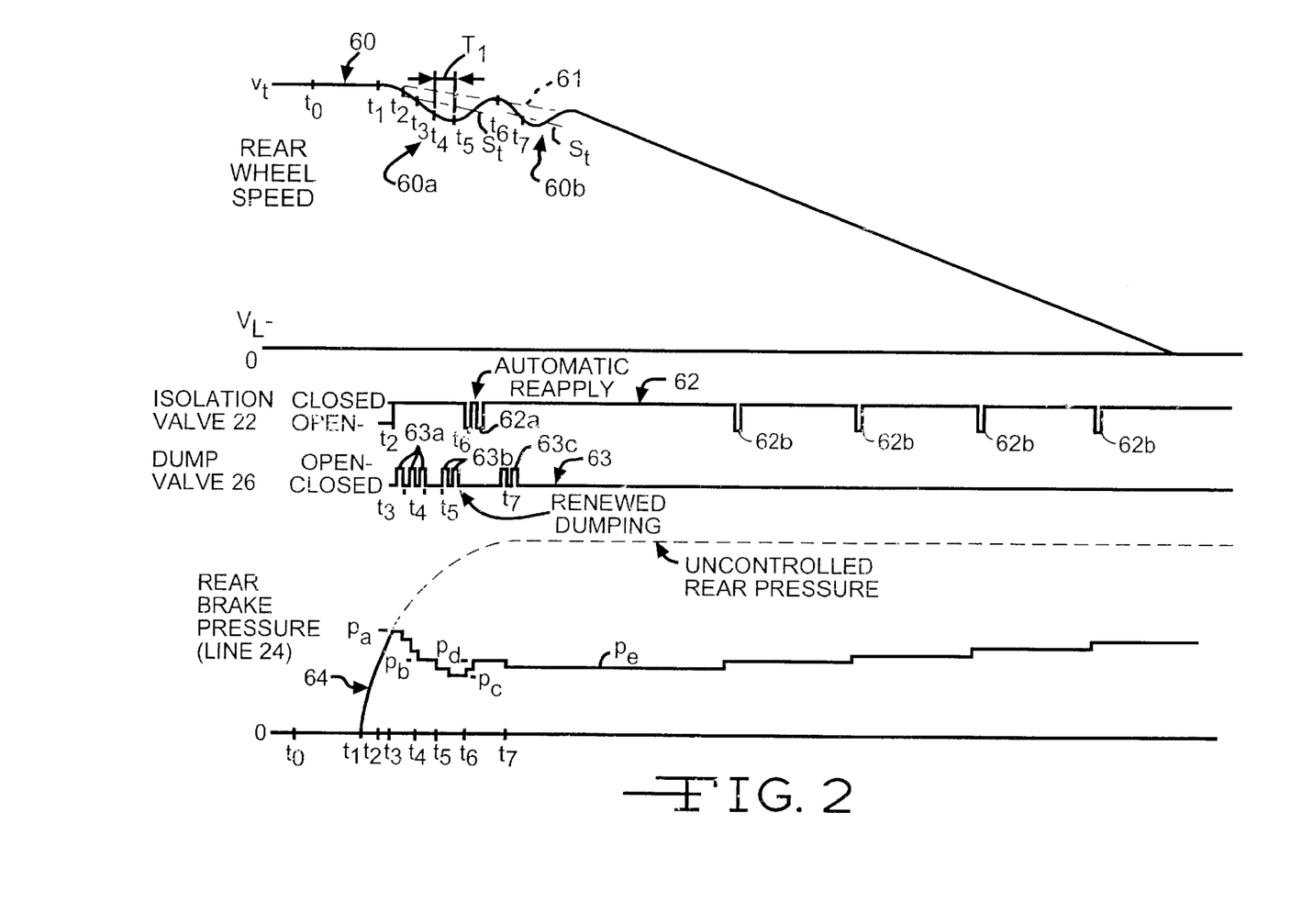
FIG. 2 illustrates the operation of the rear wheel anti-lock brake system shown in FIG. 1.

The operation of the RWAL 10 is illustrated by the graphs shown in FIG. 2. The upper solid curve labeled 60 represents the velocity of the rear wheels while the dashed curve labeled 61 represents the vehicle velocity. The operation of the isolation valve 22 and the dump valve 26 is illustrated by the curves labeled 62 and 63, respectively. The lower curve, which is labeled 64, shows the pressure applied to the controlled rear wheel brakes.

During an anti-lock braking cycle, the first and second wheel speed departures are labeled 60a and 60b, respectively. Following correction of the second wheel speed departure, which occurs at time $t_7$, the rear wheel brake pressure is maintained at a constant level $P_e$. Following the above described wheel departure and recovery cycles, it is known to open the isolation valve by supplying a number of very short reapply pulses, which are labeled 62b in FIG. 2, to the valve solenoid coil. The reapply pluses are intended to compensate for the progressive decrease in the brake lining friction coefficient due to heating and the increase in road friction that often occurs as the vehicle speed decreases. The reapply pulses also compensate for progressive thermal expansion of the rear brake drums which would cause the rear brake pressure to gradually decrease unless more brake fluid is added to the rear wheel brake system.

SUMMARY OF THE INVENTION

This invention relates to a rear wheel anti-lock brake system having an algorithm which schedules extra reapply pulses.

Figure 3:
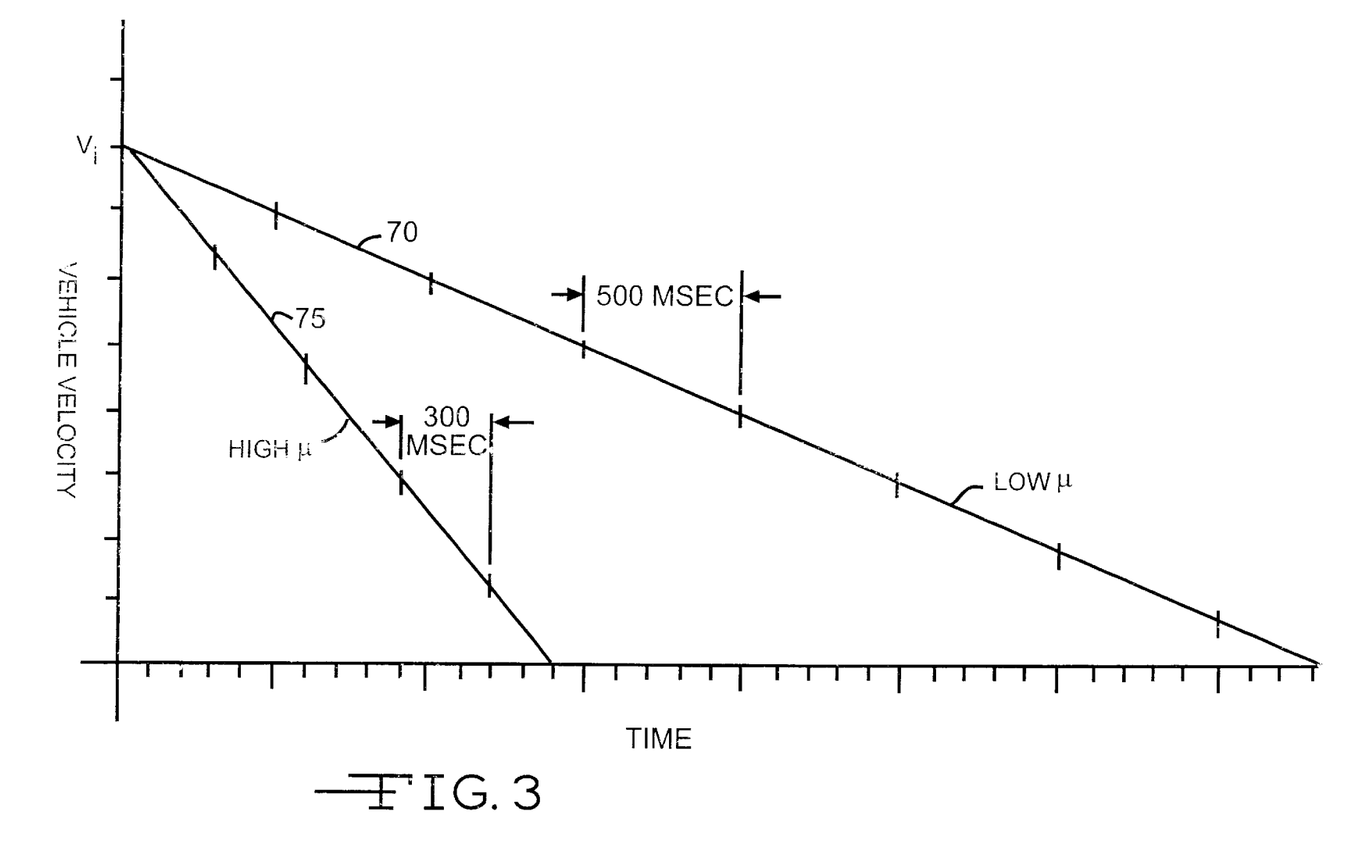
FIG. 3 is a graph of wheel speed vs. time for a prior art extra pulse reapply algorithm.

Referring again to the drawings, there is illustrated in FIG. 3, a graph of vehicle velocity vs. time which illustrates a known method for the time spacing of the reapply pulses. For simplicity, only the end portion of anti-lock brake cycle curve is shown in FIG. 3. It is desirable to have the reapply pulses spaced further apart in time on a low mu road surface than on a high mu road surface. Accordingly, the RWAL control algorithm usually includes a binary decision subroutine for determining whether the vehicle is on a low or a high mu road surface. The control algorithm then implements a difference in the time spacing of the reapply pulses that is in a ratio of five to three with the shorter time period being applied for a high mu road surface.

For the examples shown, the horizontal axis is divided into 100 millisecond increments. The upper vehicle velocity curve, which is labeled 70, is an example of the response of the control algorithm on a low mu road surface. For simplicity, a straight line is used for the upper vehicle velocity curve 70. A reapply pulse is generated every 500 milliseconds, as indicated by vertical marks on the upper curve 70.

The lower vehicle velocity curve in FIG. 3, which is labeled 75 is an example of the response of the algorithm on a high mu road surface. For simplicity, a straight line is used for the lower vehicle velocity curve 75. For illustrative purposes, it is assumed that the initial vehicle speed, $V_i$, is the same for both examples. A reapply pulse is generated every 300 milliseconds, as indicated by vertical marks on the lower curve 75.

For the examples shown in FIG. 3, the RWAL control algorithm results in seven reapply pulses being generated when the vehicle is on a low mu road surface while only four reapply pluses are generated on a high mu road surface. It would be desirable to increase the number of reapply pulses on the high mu road surface to further enhance the braking of the vehicle.

The present invention contemplates scheduling the reapply pulses at predetermined decrements in vehicle velocity during the portion of the anti-lock brake cycle that the rear wheel brake pressure is being held substantially constant. The predetermined decrements are trimable to allow adjustment of the braking cycle for the specific vehicle.

The present invention is contemplated for use with an anti-lock brake system for a vehicle having at least one wheel brake connected to a master cylinder. The anti-lock brake system includes an isolation valve connected between the master cylinder and the controlled wheel brake and a dump valve connected to the rear wheel brake. Additionally, the system has a speed sensor for monitoring the vehicle speed. The system further includes a controller electrically coupled to the isolation dump valves and the speed sensor. The controller being operative, upon detecting a potential lock-up condition of the vehicle wheel associated with the controlled wheel brake, to selectively operate the isolation and dump valves to correct the potential wheel lock-up condition. Following correction of said potential lock-up condition, the controller is further operative to selectively open the isolation valve upon the vehicle speed being decremented by a predetermined amount to generate a reapply pulse.

The invention further contemplates that the controller selectively opens the isolation valve generate the reapply pulse after a predetermined time period has elapsed following the correction of the potential wheel lock-up condition. In the preferred embodiment, the controlled wheel brake is a rear wheel brake.

It is further contemplated that the controller is operable to generate a plurality of reapply pluses, one of the reapply pulses being generated every time said vehicle speed is decremented by said predetermined amount.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 4:
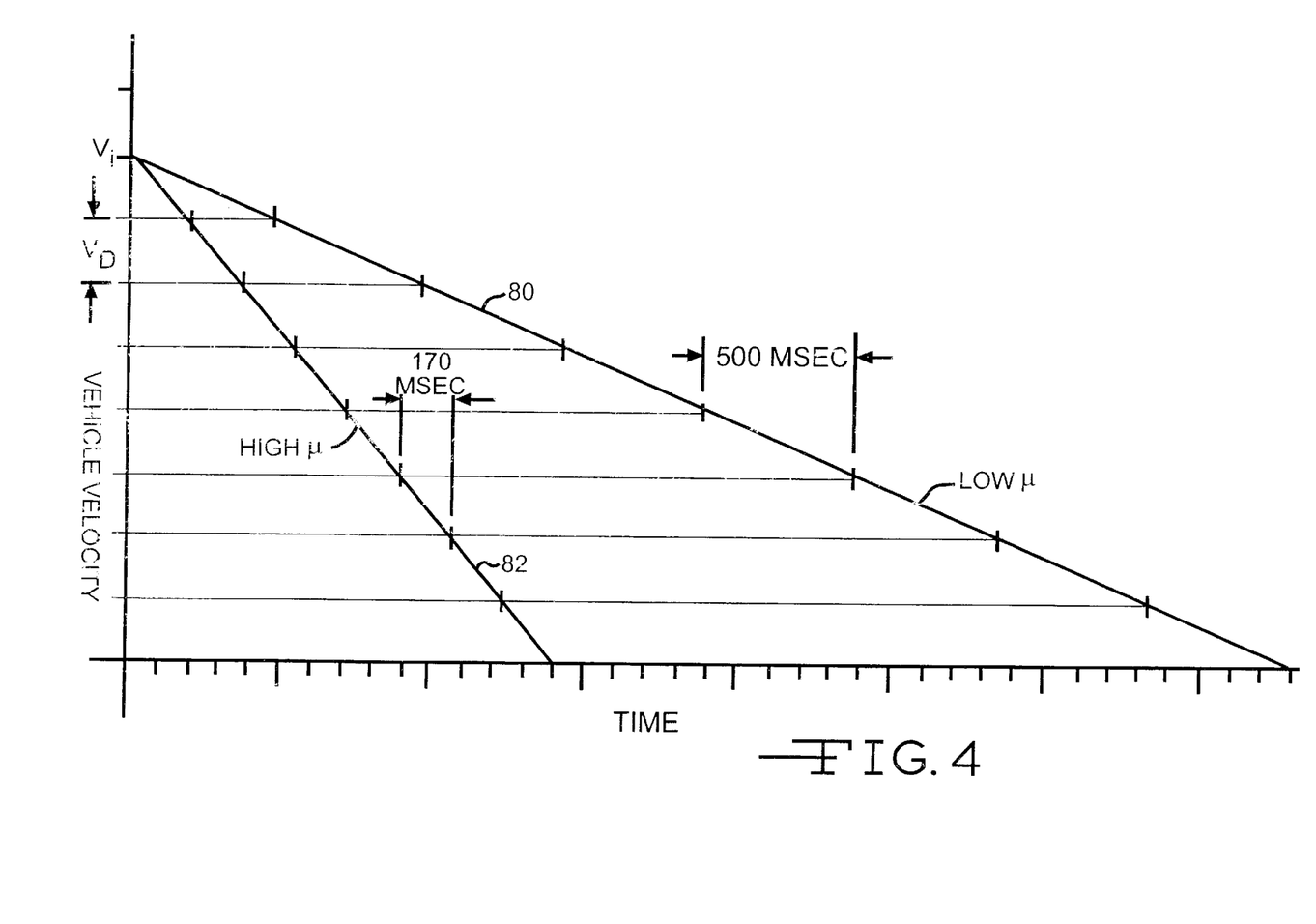
FIG. 4 is a graph of wheel speed vs. time for an extra pulse reapply algorithm in accordance with this invention.

Referring again to the drawings, there are illustrated in FIG. 4, examples of reapply pulses generated by a RWAL control algorithm in accordance with the invention. As in FIG. 3, for simplicity, only the end portion of the anti-lock brake cycle curve is shown in FIG. 4. Similar to the examples shown in FIG. 3, the upper vehicle velocity curve 80 is an example of the response of the algorithm on a low mu road surface while the lower vehicle velocity curve 82 is an example of the response of the algorithm on a high mu road surface. Additionally, the velocity curves 80 and 82 have the same slopes as the corresponding curves 70 and 75 shown in FIG. 3. For simplicity, straight lines have been used for the vehicle velocity curves 80 and 82. The RWAL control algorithm causes the RWAL microprocessor to generate a reapply pulse every time the vehicle velocity is decremented by a predetermined amount, $V_D$. On the graph, a horizontal line extends from each of the decrements on the vertical axis. The intersection of each horizontal line with the vehicle velocity curve indicates the time for generating a reapply pulse.

For the low mu example, the velocity decrement $V_D$ results in a reapply pulse being generated every 500 milliseconds, which is the same as in the previous example for a low mu road surface shown in FIG. 3. However, for the high mu example, the decrement $V_D$ results in a reapply pulse being generated every 170 milliseconds, which is a shorter time period between pulses than the 300 millisecond time period between reapply pulses shown for a high mu road surface in FIG. 3. Accordingly, seven reapply pulses are generated for the high mu road surface in FIG. 4, which is an increase of three over the previous example as shown by curve 75 in FIG. 3. Thus, the braking effort for the vehicle on a high mu road surface is increased.

Figure 5:
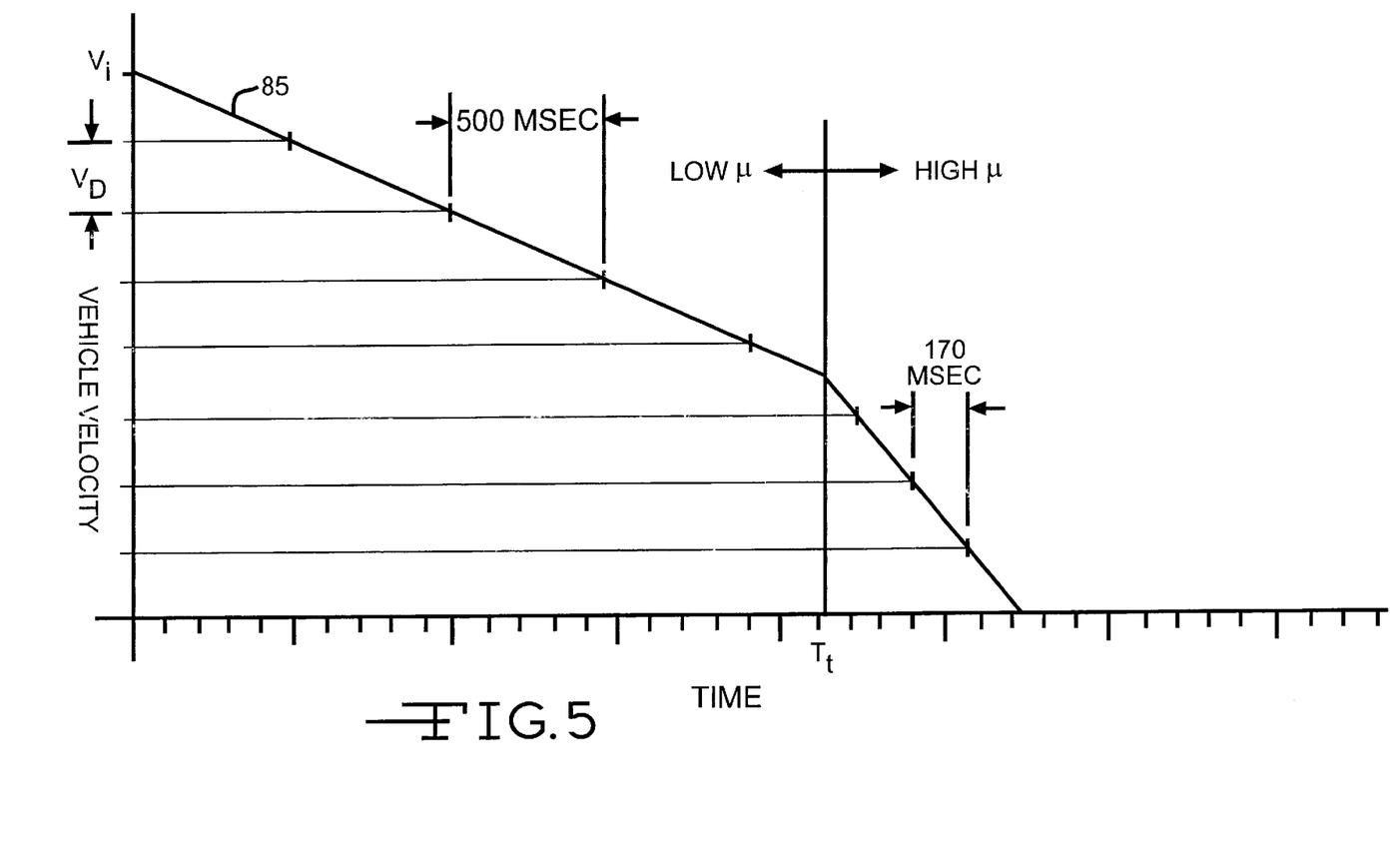
FIG. 5 is a graph of wheel speed vs. time for the extra pulse reapply algorithm illustrated in FIG. 4 which includes a transition form a low mu to a high mu road surface.

A transition from a low mu road surface to a high mu road surface is illustrated with the vehicle velocity curve 85 shown in FIG. 5. The increase in the slope of the curve 85 following the road surface transition has been exaggerated in FIG. 5 for illustrative purposes. An anti-lock braking cycle is initiated while the vehicle is being braked upon a low mu road surface. Once the pressure applied to the controlled rear wheel brakes has reached a constant value, the algorithm is operative to cause the microprocessor to generate a reapply pulse for every velocity decrement $V_D$, as described above. A reapply pulse is generated every 500 milliseconds while the vehicle remains upon the low mu road surface. At $T_t$, the vehicle transitions onto a high mu road surface. Accordingly, the increased surface friction causes the vehicle to decelerate more rapidly. As shown in FIG. 5, the reapply pulses continue to be generated after the surface transition for the same velocity decrement $V_d$. This causes a reapply pulse to be generated every 170 milliseconds after $T_t$.

Similarly, if the vehicle should transition from a high mu road surface to a low mu road surface, the slope of the vehicle velocity curve would decrease (not shown). Accordingly, the present invention would be operative to increase the spacing between the reapply pulses (not shown).

As described above, the velocity decrement $V_D$ can be trimmed, or set for a specific value. Thus, a decrease in the decrement $V_D$ will decrease the reapply pulse time period and increase the number of reapply pulses generated. Similarly, an increase in the decrement $V_D$ will increase the reapply pulse time period and decrease the number of reapply pulses generated.

The present invention provides reapply pulses having a frequency which varies in direct proportion to the mu of the road surface. Indeed, the frequency of the reapply pulses is a continuous function of the mu of the road surface and is no longer limited to a finite number of choices. Furthermore, the variation between the time spacing of the reapply pulses will be in the same ratio as the maximum to minimum achievable vehicle deceleration on different mu road surfaces, which can exceed a ratio of 10 to 1. Thus, the present invention provides an enhanced response over the fixed ratio of 5 to 3 utilized for spacing reapply pulses in prior art systems.

Figure 6:
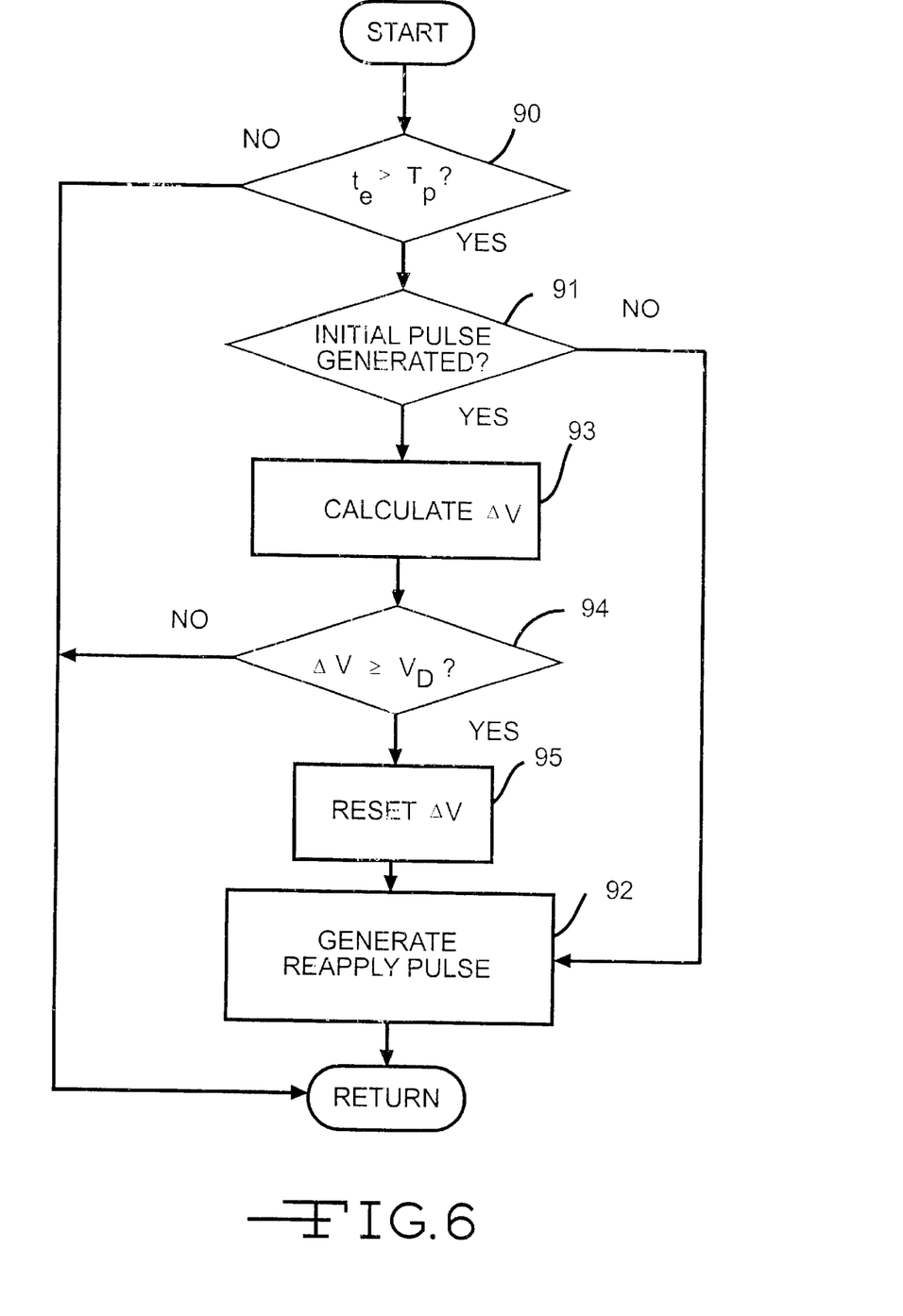
FIG. 6 is a flow chart for the extra pulse reapply algorithm illustrated in FIG. 4.

A flow chart for a subroutine for generating the reapply pulses is shown in FIG. 6. The subroutine is called during each iteration of the main RWAL control subroutine. In decision block 90, the elapsed time, $t_e$, since the completion of the initial wheel departure and recovery cycles of the RWAL braking cycle is compared to a predetermined time period, $T_p$. If the predetermined time period has not elapsed, the subroutine returns to the main RWAL control algorithm. If the predetermined time period has elapsed, the subroutine continues to decision block 91 to determine if an initial reapply pulse has been generated.

If an initial pulse has not been generated, the subroutine transfers from decision block 91 to functional block 92 and causes the RWAL microprocessor to generate a reapply pulse. Following generation of a reapply pulse, the subroutine returns to the main RWAL control algorithm. While the flowchart in FIG. 6 shows generation of a reapply pulse as part of the subroutine, it will be appreciated that the invention can also be practiced with the subroutine setting a reapply pulse flag. The main RWAL control program would then actually generate the reapply pulse and reset the reapply pulse flag.

If an initial pulse has been generated, the subroutine transfers from decision block 91 to functional block 93 where the change in vehicle velocity since the reapply pulse was generated is calculated. The subroutine then continues to decision block 94 where the change in vehicle velocity since the last reapply pulse $\Delta V$ is compared to the velocity decrement $V_D$. If the change in vehicle velocity $\Delta V$ is less than the decrement $V_D$, the subroutine returns to the main RWAL control algorithm. If the change in vehicle velocity $\Delta V$ is greater than or equal to the decrement $V_D$, the subroutine resets the change in vehicle velocity $\Delta V$ to zero in functional block 95 and then transfers to functional block 92 and causes the RWAL microprocessor to generate a reapply pulse. Alternately, as described above, a reapply pulse flag can be set in functional block 92 with the actual generation of the reapply pulse provided by the RWAL control program. Following generation of a reapply pulse, the subroutine returns to the main RWAL control algorithm.

Figure 7:
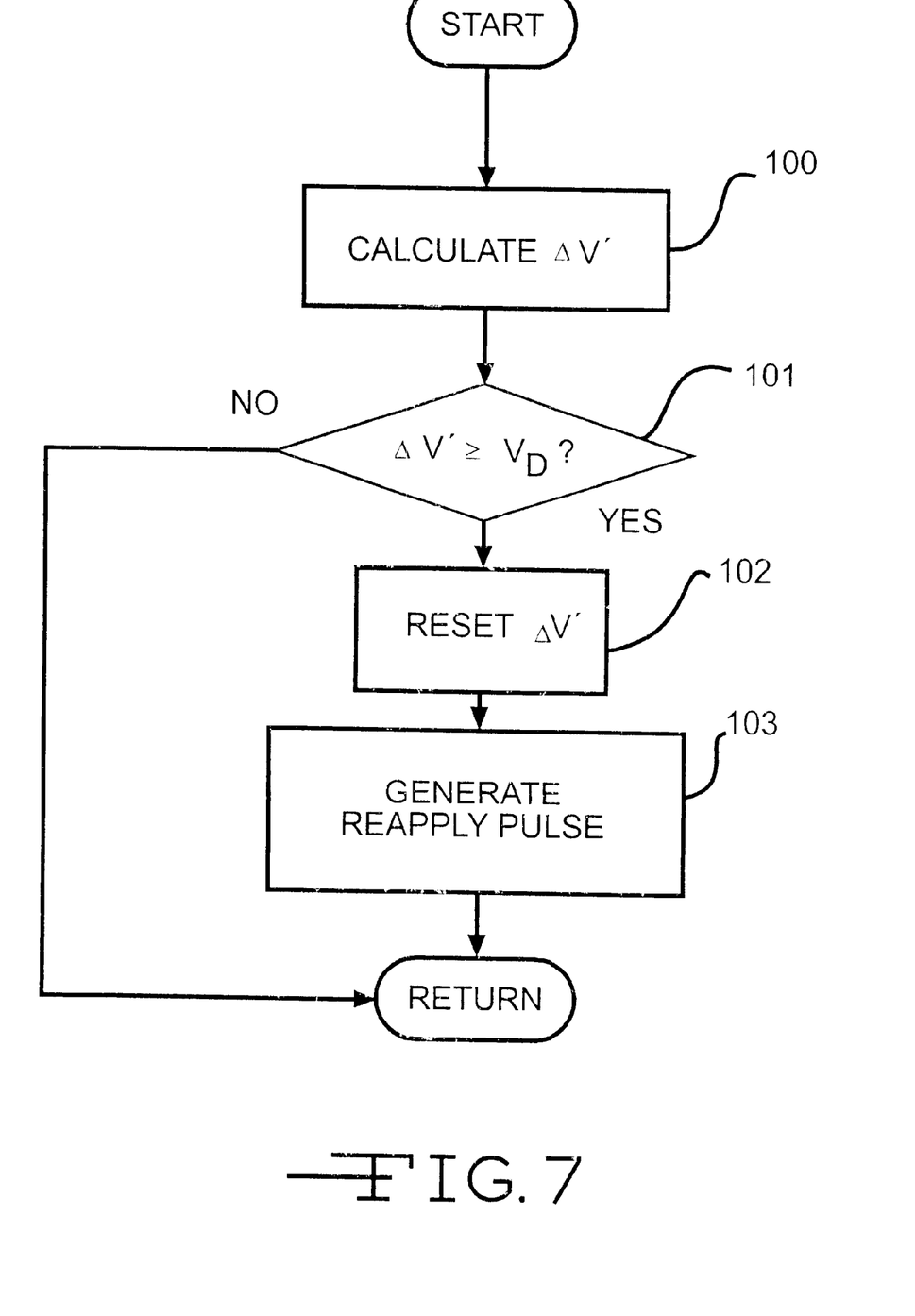
FIG. 7 is a flow chart for an alternate embodiment of the extra pulse reapply algorithm illustrated in FIG. 4.

The invention also contemplates an alternate embodiment of the subroutine as illustrated by the flow chart shown in FIG. 7. The alternate embodiment eliminates the initial time delay for the first reapply pulse shown in FIG. 6. In FIG. 7, the subroutine begins by calculating a change in vehicle speed, $\Delta V'$. In the preferred embodiment, the initial time through the subroutine, $\Delta V'$ is calculated relative to the vehicle speed when the potential wheel lock-up condition has been corrected. Alternately, a predetermined threshold can be utilized for calculating $\Delta V'$ (not shown). The subroutine continues to decision block 101 where $\Delta V'$ is compared to the velocity decrement $V_D$. If $\Delta V'$ is less than the decrement $V_D$, the subroutine returns to the main RWAL control algorithm. If $\Delta V'$ is greater than or equal to the decrement $V_D$, the subroutine resets $\Delta V'$ to zero in functional block 102. The subroutine then transfers to functional block 103 and causes the RWAL microprocessor to generate a reapply pulse. Alternately, as described above, a reapply pulse flag can be set in functional block 103 with the actual generation of the reapply pulse provided by the RWAL control program. Following generation of a reapply pulse, the subroutine returns to the main RWAL control algorithm.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been described and illustrated for a RWAL, it will be appreciated that the invention also can be practiced upon a conventional anti-lock brake system which controls all of the vehicle wheel brakes.

What is claimed is:

1. An anti-lock brake system for a vehicle having at least one wheel brake connected to a master cylinder, the anti-lock brake system comprising:

an isolation valve connected between the master cylinder and the controlled wheel brake;

a dump valve connected to the rear wheel brake;

a speed sensor for monitoring the vehicle speed;

a controller electrically coupled to said isolation valve and said dump valve and said speed sensor, said controller being operative, upon detecting a potential lock-up condition of the vehicle wheel associated with the controlled wheel brake, to selectively operate said isolation and dump valves to correct said potential wheel lock-up condition, said controller being further operative following correction of said potential lock-up condition to selectively open, and subsequently close, said isolation valve upon the vehicle speed being reduced by a predetermined wheel speed decrement to generate a reapply pulse.

2. The anti-lock brake system according to claim 1 wherein said isolation vale is selectively opened to generate said reapply pulse after a predetermined time period has elapsed following said correction of said potential wheel lock-up condition.

3. The anti-lock brake system according to claim 2 wherein said controlled wheel brake is a rear wheel brake.

4. The anti-lock brake system according to claim 2 wherein said predetermined wheel speed decrement is trimable.

5. The anti-lock brake system according to claim 2 wherein said controller is operable to generate a plurality of said reapply pluses, one of said reapply pulses being generated every time said vehicle speed is decremented by said predetermined amount.

6. The anti-lock brake system according to claim 5 wherein said controller includes a microprocessor which has a memory and further wherein said microprocessor memory includes an algorithm for generating said reapply pulses.

7. The anti-lock brake system according to claim 1 wherein said isolation valve is selectively opened to generate said reapply pulse after the vehicle speed has been decremented by a predetermined amount from the speed of the vehicle which exists following said correction of said potential wheel lock-up condition.

8. The anti-lock brake system according to claim 7 wherein said controller is further operable to generate a plurality of additional reapply pluses after said initial pulse, one of said additional reapply pulses being generated every time said vehicle speed is decremented by said predetermined amount.

9. The anti-lock brake system according to claim 1 wherein said isolation valve is selectively opened to generate said reapply pulse after the vehicle velocity has decreased below a predetermined threshold.

10. The anti-lock brake system according to claim 9 wherein said controller is further operable to generate a plurality of additional reapply pluses after said initial pulse, one of said additional reapply pulses being generated every time said vehicle speed is decremented by said predetermined amount.

11. The anti-lock brake system according to claim 1 wherein said controller is operable to generate a plurality of said reapply pluses, one of said reapply pulses being generated every time said vehicle speed is decremented by said predetermined amount.

\* \* \* \* \*